United States Patent
Hsu et al.

(10) Patent No.: US 8,059,392 B2
(45) Date of Patent: Nov. 15, 2011

(54) FRAME STRUCTURE, SUPPORT, AND DISPLAY APPARATUS USING THE SAME

(75) Inventors: Cheng-Hung Hsu, Taipei Hsien (TW); Chun-Hong Kuo, Taipei Hsien (TW); Sheng-Chieh Yang, Taipei Hsien (TW); Chi-Wei Kuo, Taipei Hsien (TW); Guo-Bao Ye, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 283 days.

(21) Appl. No.: 12/453,012

(22) Filed: Apr. 28, 2009

(65) Prior Publication Data

US 2010/0103595 A1  Apr. 29, 2010

(30) Foreign Application Priority Data

Oct. 24, 2008 (TW) ................................ 97141047 A

(51) Int. Cl.
  *G06F 1/16* (2006.01)
(52) U.S. Cl. ......... 361/679.21; 361/679.22; 361/679.26; 248/917; 248/918; 312/223.1; 312/223.2
(58) Field of Classification Search ............. 361/679.59, 361/679.21, 679.22, 679.26; 248/917, 918; 312/223.1, 223.2
See application file for complete search history.

(56) References Cited

U.S. PATENT DOCUMENTS

| | | | | |
|---|---|---|---|---|
| 6,104,451 A * | 8/2000 | Matsuoka et al. | ............... | 349/58 |
| 7,361,046 B2 * | 4/2008 | Drew | ............................. | 439/353 |
| 7,672,121 B2 * | 3/2010 | Li et al. | ..................... | 361/679.21 |
| 7,733,645 B2 * | 6/2010 | Hsu | ........................... | 361/679.59 |
| 7,907,391 B2 * | 3/2011 | Park et al. | ................ | 361/679.21 |
| 2005/0023418 A1 * | 2/2005 | Kim | ................................ | 248/121 |
| 2005/0236548 A1 * | 10/2005 | Maruta | ........................ | 248/476 |
| 2006/0018092 A1 * | 1/2006 | Nagano | ........................ | 361/687 |
| 2006/0061945 A1 * | 3/2006 | Kim | ................................ | 361/681 |
| 2006/0227499 A1 * | 10/2006 | Jeong et al. | ..................... | 361/681 |
| 2006/0289716 A1 * | 12/2006 | Cai et al. | ........................ | 248/371 |
| 2007/0064388 A1 * | 3/2007 | Uchizono et al. | ............. | 361/690 |
| 2007/0133158 A1 * | 6/2007 | Oda et al. | ........................ | 361/681 |
| 2007/0153454 A1 * | 7/2007 | Chang et al. | ................... | 361/681 |
| 2008/0186664 A1 * | 8/2008 | Chang et al. | ................... | 361/681 |

FOREIGN PATENT DOCUMENTS

| | | |
|---|---|---|
| CN | 1838331 A | 9/2006 |
| CN | 200990742 Y | 12/2007 |

OTHER PUBLICATIONS

Chinese Office Action in corresponding Application No. 200810172651.3, dated Feb. 1, 2011.

* cited by examiner

*Primary Examiner* — Jinhee Lee
*Assistant Examiner* — Anthony Q Edwards
(74) *Attorney, Agent, or Firm* — Bacon & Thomas, PLLC

(57) ABSTRACT

A frame structure is disclosed. The frame structure comprises a first side frame, a second side frame, a top support frame and a base support frame. The second side frame is substantially parallel to the first side frame, and a circuit board is disposed between the first side frame and the second side frame. The top support frame comprises a support plane for connecting to the first side frame and the second side frame. The base support frame is substantially parallel to the top support frame, and the base support frame comprises a compartment, a first protrusion, and a second protrusion. A power supply unit can be disposed in the compartment. The first protrusion connects to the first side frame, and the second protrusion connects to the second side frame.

14 Claims, 6 Drawing Sheets

FRAME STRUCTURE, SUPPORT, AND DISPLAY APPARATUS USING THE SAME

BACKGROUND OF THE INVENTION

1. Field of the Invention

The present invention relates to a frame structure and foot stand, and, more particularly, to a frame structure and foot stand for a display device, which can improve the efficiency of assembly and reduce manufacturing costs.

2. Description of the Related Art

With improvements in image processing technologies, traditional cathode ray tube televisions or display devices are being slowly replaced by LCD display devices or plasma display devices. Taking the LCD display device as an example, its flat screen design saves a large amount of space, and as a result, the LCD display device can be placed on a foot stand or hung on a wall to provide convenience in arrangement of space.

In general, during the assembly of the LCD display device, in order to achieve a thin design while including all necessary components, a large number of panel-bearing elements and securing components are required. Furthermore, a foot stand, which is usually secured by screws, must be installed on the LCD display device for various tests. However, the abovementioned processes induce longer times and higher costs during the assembly of the LCD display device. Also, to meet safety standards, the circuit board and the power supply unit in the LCD display device must be separated by a predetermined distance, but this requirement leads to added length to the entire structure of the display device, increasing the size and the volume of the display device.

Therefore, it is desirable to provide a frame structure and a related foot stand for a display device to mitigate and/or obviate the aforementioned problems.

SUMMARY OF THE INVENTION

A main objective of the present invention is to provide a frame structure for a display device that utilizes a simplified structure combination to improve the efficiency of assembly and reduce manufacturing costs.

Another objective of the present invention is to provide a foot stand suitable for the display device which is easy to assemble and disassemble without using tools.

In order to achieve the abovementioned main objective, the present invention provides a frame structure that comprises a first side frame, a second side frame, a top support frame, and a base support frame. The second side frame is substantially parallel to the first side frame, and a circuit board can be disposed between the first side frame and the second side frame. The top support frame comprises a support plane for connecting to the first side frame and the second side frame. The base support frame is substantially parallel to the top support frame, and the base support frame comprises a compartment, a first protrusion, and a second protrusion. The compartment is used for containing the power supply unit. The first protrusion is connected to the first side frame, and the second protrusion is connected to the second side frame. The support plane, the first protrusion, and the second protrusion are maintained on the same plane. The frame structure of the present invention utilizes a simplified structure combination to improve the efficiency of assembly and reduce manufacturing costs.

In order to achieve the abovementioned second objective of the present invention, the foot stand comprises a main body, at least one positioning structure and at least one fastening structure. The at least one positioning structure and the at least one fastening structure are disposed on the main body. The at least one positioning structure corresponds to at least one corresponding positioning structure of the display device to support and position the display device. The at least one fastening structure corresponds to at least one corresponding fastening structure of the display device to secure the display device.

The display device of the present invention comprises a display panel, a circuit board, a power supply unit, and the abovementioned frame structure. The frame structure is combined with the display panel, and the frame structure is used to hold the circuit board and the power supply unit in place. The frame structure requires fewer components, which improves the speed of assembly of the display device and reduces the volumetric size of the display device. The display device may further include the abovementioned foot stand, which can reduce assembly costs.

Other objects, advantages, and novel features of the invention will become more apparent from the following detailed description when taken in conjunction with the accompanying drawings.

DETAILED DESCRIPTION OF THE PREFERRED EMBODIMENT

With reference to the attached drawings, the present invention is described by means of the embodiments below.

Figure 1:
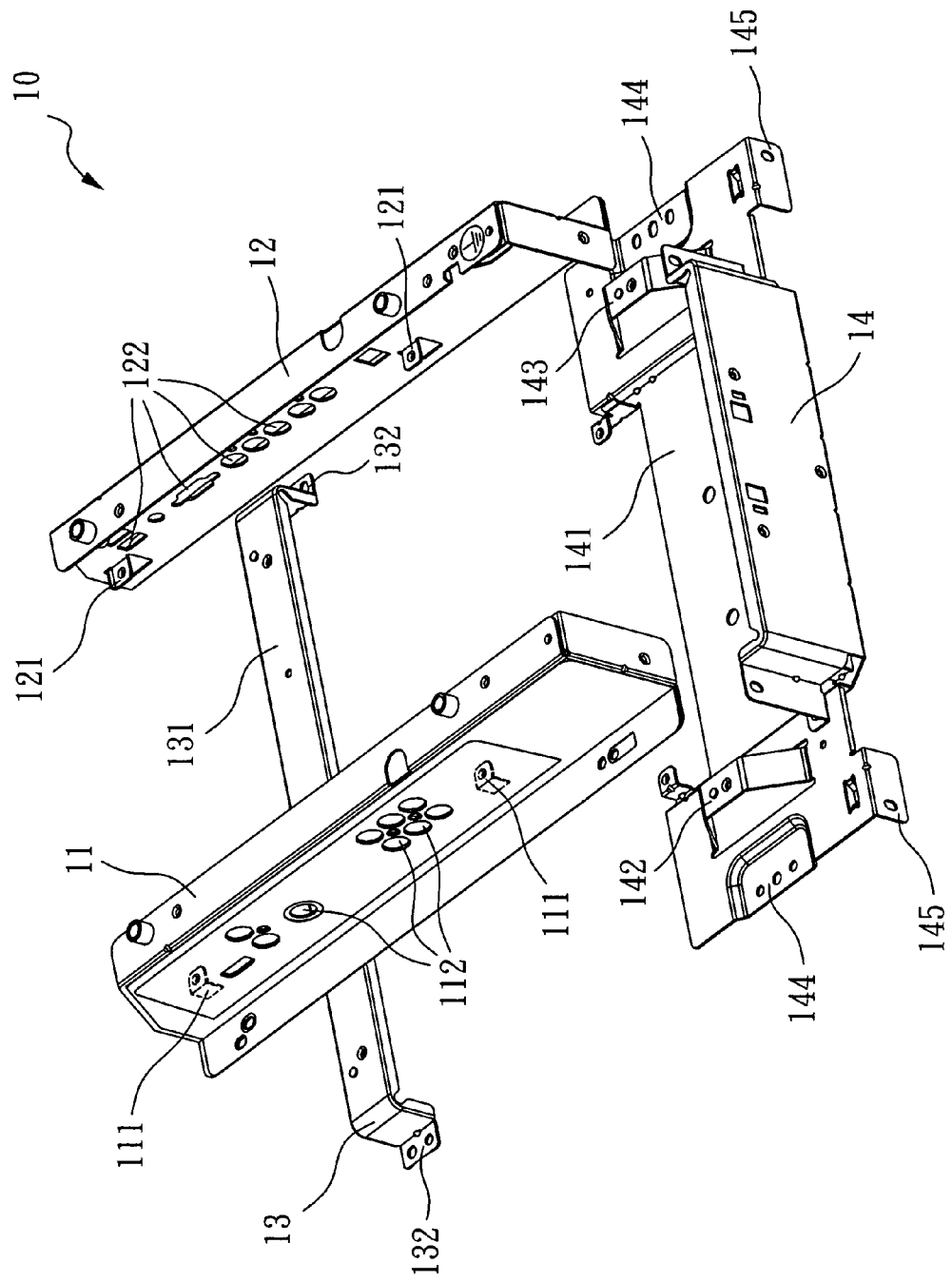
FIG. 1 is an exploded view of a frame structure of the present invention.

Please refer to FIG. 1. FIG. 1 is an exploded view of a frame structure according to the present invention. A frame structure 10 of the present invention may be applied in a display device (not shown). As shown in FIG. 1, the frame structure 10 comprises a first side frame 11, a second side frame 12, a top support frame 13, and a base support frame 14. The first side frame 11 comprises a first positioning portion 111 and a plurality of through holes 112, and the second side frame 12 comprises a second positioning portion 121 and a plurality of through holes 122. The top support frame 13 comprises a support plane 131 and two securing portions 132. The base support frame 14 comprises a compartment 141, a first protrusion 142, a second protrusion 143, two securing portions 144, and two bent portions 145. The support plane 131 is kept on the same plane as the first protrusion 142 and the second protrusion 143. The assembled positions of the first positioning portion 111 and the second positioning portion 121 are higher than the assembled position of the compartment 141.

Figure 2:
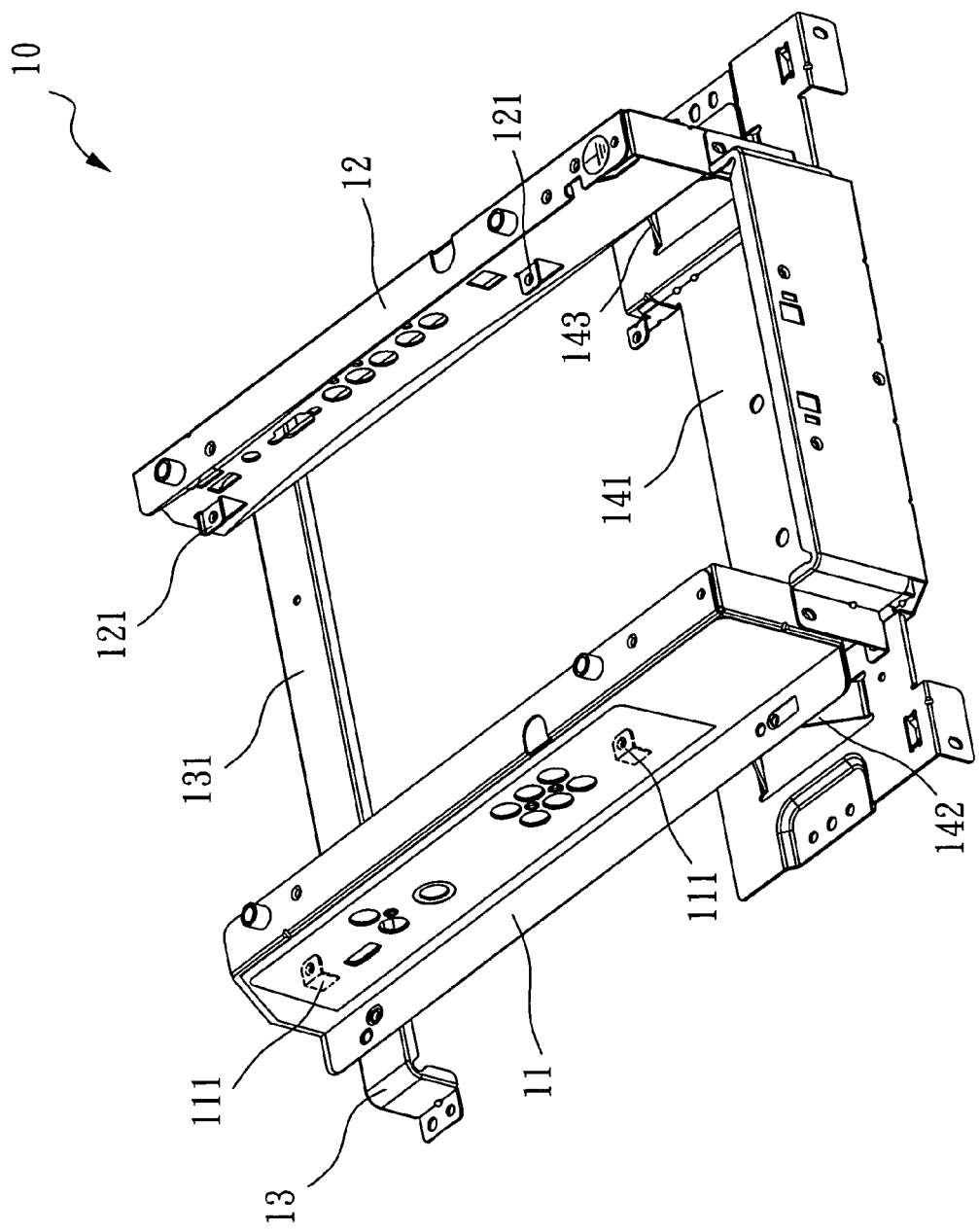
FIG. 2 is a schematic drawing of a frame structure of the present invention.

Please refer to FIG. 2. FIG. 2 is a schematic drawing of the frame structure according to the present invention. As shown in FIG. 2, during assembly of the frame structure 10, the support plane 131 and the first protrusion 142 are used to connect with the first side frame 11, and the support plane 131 and the second protrusion 143 are used to connect with second side frame 12. Since the support plane 131, the first protrusion 142, and the second protrusion 143 all have the same height, the first side frame 11 and the second side frame 12 can be positioned substantially horizontally. As a result, the second side frame 12 is substantially parallel to the first side frame 11, and the base support frame 14 is substantially parallel to the top support frame 13. The frame structure 10 thus assembles as a rectangular structure, which provides the structure stability.

Figure 3:
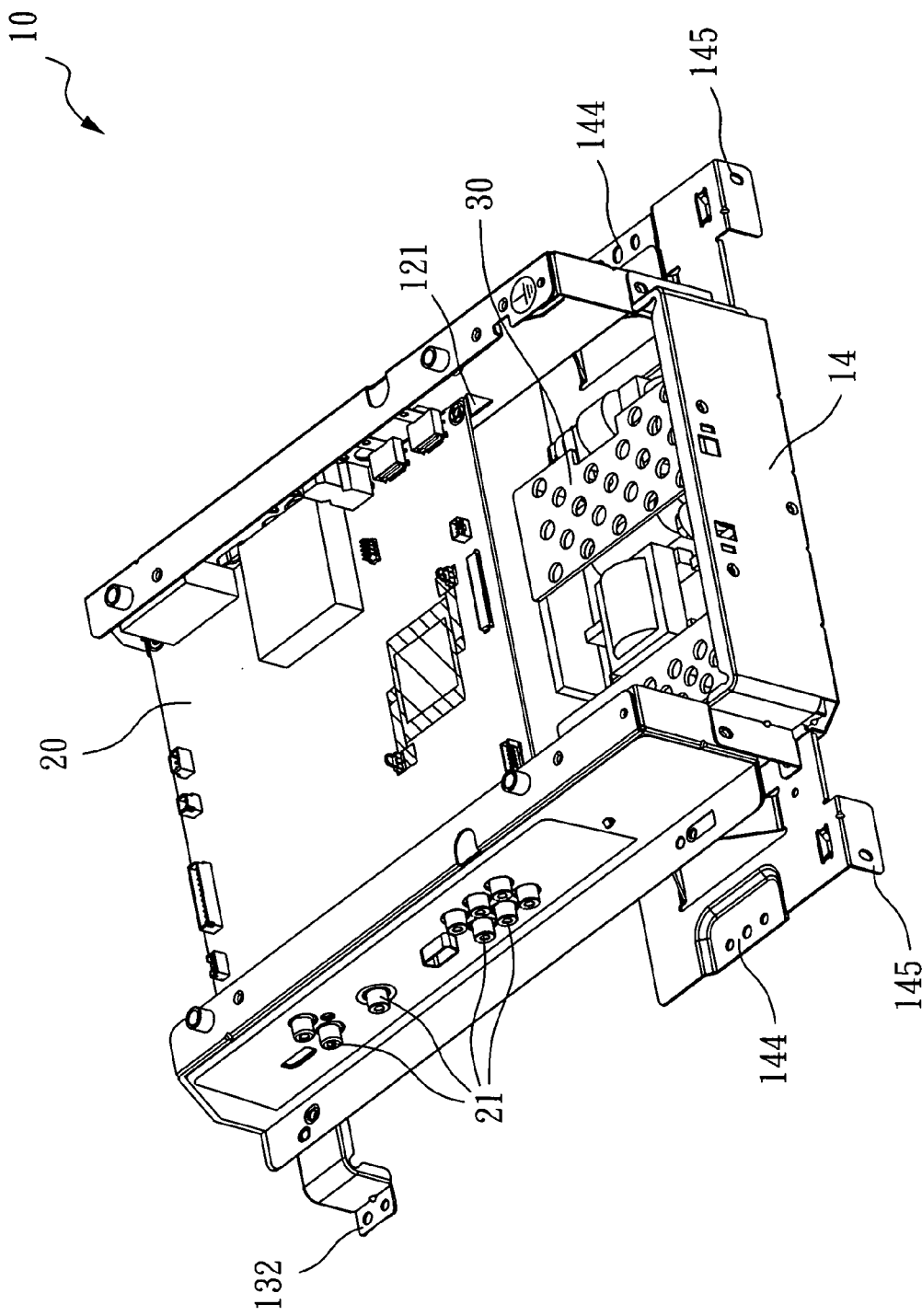
FIG. 3 is a schematic drawing of a frame structure, a circuit board and a power supply unit of the present invention.

Please refer to FIG. 1 and FIG. 3. FIG. 3 is a schematic drawing of the frame structure, the circuit board, and the power supply unit of the present invention. As shown FIG. 1 and FIG. 3, a circuit board 20 is placed between the first side frame 11 and the second side frame 12 of the frame structure 10, and the circuit board 20 is supported and positioned by the first positioning portion 111 and the second positioning portion 121. The first side frame 11 and the second side frame 12 further comprises a plurality of through holes 112, 122 corresponding to a plurality of interface slots 21 of the circuit board 20, such that the plurality of interface slots 21 are exposed through the plurality of through holes 112, 122 to provide external connections. The compartment 141 of the frame structure 10 is used for holding a power supply unit 30, and the power supply unit 30 is electrically connected to the circuit board 20. The assembled positions of the first positioning portion 111 and the second positioning portion 121 are higher than the assembled position of the compartment 141 such that the circuit board 20 and the power supply unit 30 placed in the frame structure 10 are on different plates. In this embodiment, the circuit board 20 and the power supply unit 30 are positioned one after another, and the height difference between them remains unchanged to meet safety standards. Therefore, as compared to the prior art, the circuit board 20 and the power supply unit 30 are not placed on the same plate, thus reducing the total length, which reduces the volume of the display device. However, the circuit board 20 and the power supply unit 30 can be positioned in a partially or completely overlapping manner to meet safety distance requirements with height differences. Different designs may be employed with different types of display panels.

The top support frame 13 of the frame structure 10 further comprises two securing portions 132, which are placed on two sides of the top support frame 13. The two securing portions 132 are used for combining the top support frame 13 with the display panel (not shown) of the display device. The base support frame 14 further comprises two securing portions 144 and two bent portions 145. The two securing portions 144 and the two bent portions 145 are positioned correspondingly and are used for combining the base support frame 14 with the display panel (not shown). With the abovementioned design, the frame structure 10 provides secure locking of the display panel and requires fewer components and screws for assembly; therefore, the frame structure provides improved convenience and safety.

Figure 4:
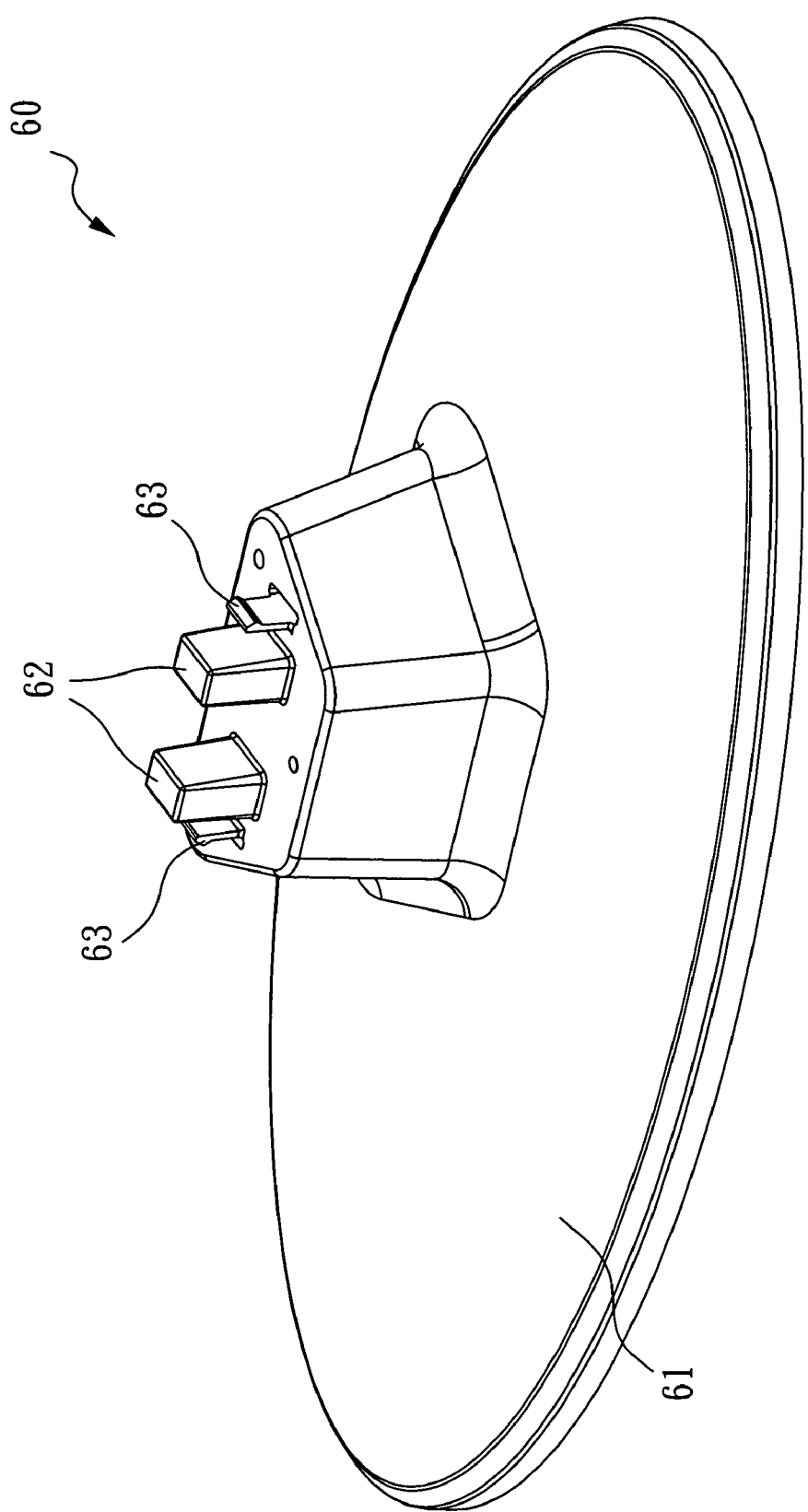
FIG. 4 is perspective view of a foot stand of the present invention.

Please refer to FIG. 4. FIG. 4 is perspective view of a foot stand according to the present invention. As shown in FIG. 4, the foot stand 60 comprises a main body 61, at least one positioning structure 62, and at least one fastening structure 63. The at least one positioning structure 62 and the at least one fastening structure 63 are disposed on the main body 61. When the foot stand 60 is installed on a display device (not shown), each positioning structure 62 provides support and positioning for the display device to assist the foot stand 60 in supporting the display device. Each fastening structure 63 provides fastening for the display device so that the foot stand 60 does not easily fall off.

Figure 5:
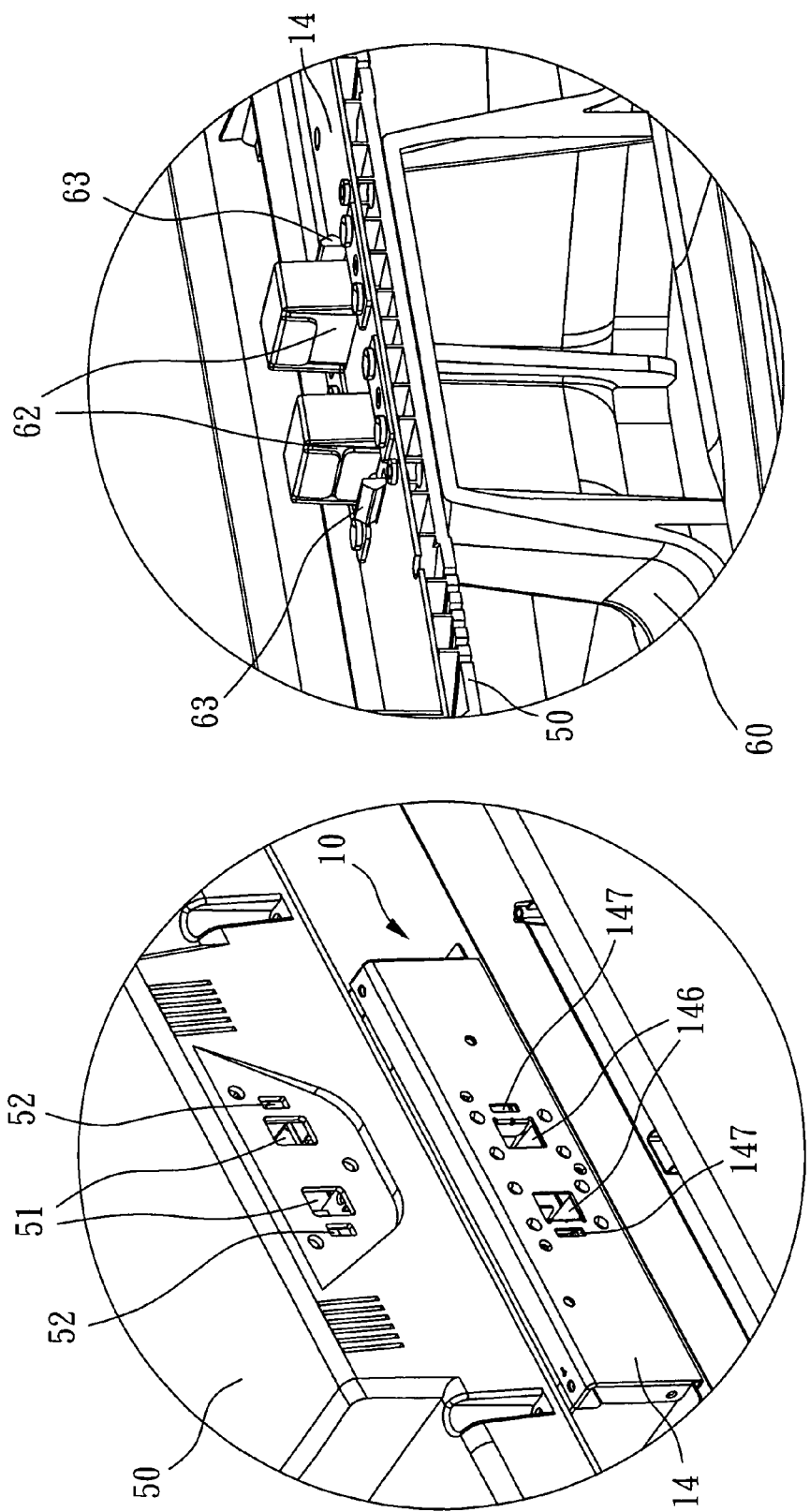
FIG. 5 is a schematic drawing of the foot stand of the present invention.

Please refer to FIG. 5. FIG. 5 is a schematic drawing of a foot stand according to the present invention. The foot stand 60 may be used with any type of display device. The display device comprises a frame structure and a back cover, and the foot stand 60 engages with the frame structure and the back cover. As shown in FIG. 5, for example, when the foot stand 60 is applied to the abovementioned frame structure 10, at least one corresponding positioning structure 146 and at least one corresponding fastening structure 147 are disposed on the base support frame 14 of the frame structure 10. The at least one corresponding positioning structure 146 corresponds to the at least one positioning structure 62 of the foot stand 60, and the at least one corresponding fastening structure 147 corresponds to the at least one fastening structure 63 of the foot stand 60. Similarly, the back cover 50 of the frame structure 10 further comprises at least one corresponding positioning structure 51 and at least one corresponding fastening structure 52; when the back cover 50 and the frame structure 10 are combined together, each corresponding positioning structure 146, 51 and each corresponding fastening structure 147, 52 overlap with each other. In this embodiment, the foot stand 60 comprises two positioning structures 62 and two fastening structures 63, and the base support frame 14 and the back cover 50 also respectively have two corresponding positioning structures 146, 51 and two corresponding fastening structures 147, 52. The positioning structure 62 is a raised block, and the corresponding positioning structure 146, 51 is a positioning hole which can engage with the raised block to provide support and positioning. The fastening structure 63 is a fastening hook, and the corresponding fastening structure 147, 52 is a fastening hole; the fastening hook can be engaged with the fastening hole to secure the foot stand. As a result, the foot stand 60 can be combined with the display device without any screws or other securing components, providing greater convenience for the user or manufacturer and reducing manufacturing costs.

Figure 6:
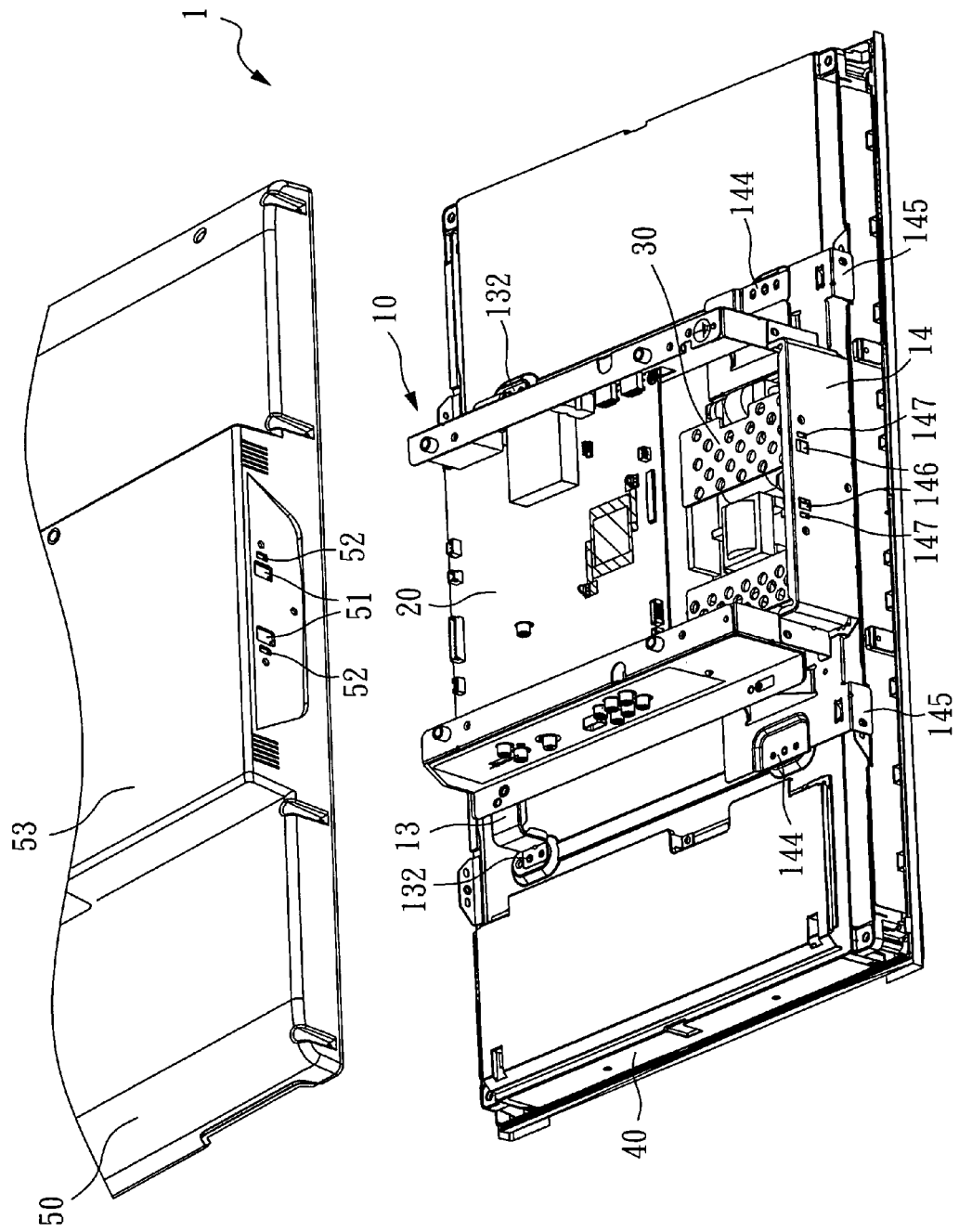
FIG. 6 is a schematic drawing of a display device of the present invention.

Please refer to FIG. 6. FIG. 6 is a schematic drawing of a display device according to the present invention. As shown in FIG. 6, the display device 1 comprises a display panel 40, a circuit board 20, a power supply unit 30, and the abovementioned frame structure 10. The frame structure 10 is combined with the display panel 40 via the two securing portions 132 of the top support frame 13, and the two securing portions 144 and two bent portions 145 of the base support frame 14; the frame structure 10 holds the circuit board 20 and the power supply unit 30. The frame structure 10 requires fewer components, which increases the speed of assembly of the display device 1. Furthermore, the circuit board 20 and the power supply unit 30 are disposed in different plates that satisfy safety distance requirements with their height differences, and other additional components such as speakers are placed behind the display panel 40 of the display device 1 to save space around the display panel 40.

The display device 1 further comprises a back cover 50, which is combined with the display panel 40, and the back cover 50 comprises a recess 53. When the back cover 50 and the display panel 40 are combined together, the recess 53 is used to contain the protrusion part of the frame structure 10. The back cover 50 thus provides protection for all elements in the display device 1. Please refer to both FIG. 4 and FIG. 5. The display device 1 further comprises the foot stand 60, which is combined with the base support frame 14 and the back cover 50. When the display device 1 is placed vertically, at least one positioning structure 62 and at least one fastening structure 63 of the foot stand 60 engage with the at least one corresponding positioning structure 146, 51 and the at least one corresponding fastening structure 147, 52 of the base support frame 14 and the back cover 50 to support and to secure the display device 1.

Although the present invention has been explained in relation to its preferred embodiments, it is to be understood that many other possible modifications and variations can be made without departing from the spirit and scope of the invention as hereinafter claimed.

What is claimed is:

1. A frame structure for a display device, the frame structure being capable of enclosing a circuit board and a power supply unit, the frame structure comprising:
   a first side frame;
   a second side frame substantially parallel to the first side frame, the circuit board capable of being disposed between the first side frame and the second side frame;
   a top support frame comprising a support plane and two securing portions, the support plane being used for connecting to the first side frame and the second side frame, and the two securing portions of the top support frame being used for combining the top support frame with a display panel of the display device; and
   a base support frame substantially parallel to the top support frame, the base support frame comprising a compartment, a first protrusion, a second protrusion, two securing portions and two bent portions, the compartment being used for containing the power supply unit, the first protrusion connecting to the first side frame, the second protrusion connecting to the second side frame, and the two securing portions and the two bent portions of the base support frame being used for combining the base support frame with the display panel.

2. The frame structure as claimed in claim 1, wherein the first side frame comprises a first positioning portion, the second side frame comprises a second positioning portion, and the first positioning portion and the second positioning portion are used for securing the circuit board.

3. The frame structure as claimed in claim 2, wherein the positions of the first positioning portion and the second positioning portion are higher than a position of the compartment, such that the circuit board and the power supply unit are located on different plates.

4. The frame structure as claimed in claim 1, wherein the first side frame and the second side frame further comprise a plurality of through holes corresponding to a plurality of interface slots of the circuit board.

5. The frame structure as claimed in claim 1, wherein the base support frame further comprises at least one corresponding positioning hole and at least one corresponding fastening structure, which are used for connecting to a foot stand.

6. A display device comprising:
   a display panel;
   a circuit board;
   a power supply unit; and
   a frame structure combined with the display panel, the frame structure comprising:
   a first side frame;
   a second side frame substantially parallel to the first side frame, and the circuit board can be disposed between the first side frame and the second side frame;
   a top support frame comprising a support plane for connecting to the first side frame and the second side frame; and
   a base support frame substantially parallel to the top support frame, and the base support frame comprises a compartment, a first protrusion, a second protrusion, two securing portions and two bent portions, the compartment being used for containing the power supply unit; the first protrusion being connected to the first side frame, and the second protrusion being connected to the second side frame, and the two securing portions and the two bent portions being used for combining the base support frame with the display panel.

7. The display device as claimed in claim 6, wherein the first side frame comprises a first positioning portion, the second side frame comprises a second positioning portion, and the first positioning portion and the second positioning portion are used for securing the circuit board.

8. The display device as claimed in claim 7, wherein the positions of the first positioning portion and the second positioning portion are higher than the position of the compartment, such that the circuit board and the power supply unit are located on different plates.

9. The display device as claimed in claim 6, wherein the first side frame and the second side frame further comprise a plurality of through holes corresponding to a plurality of interface slots of the circuit board.

10. The display device as claimed in claim 6, wherein the top support frame further comprises two securing portions, and the two securing portions are used for combining the top support frame with the display panel.

11. The display device as claimed in claim 6 further comprising a back cover combined with the display panel, the back cover comprising a recess, and the recess is used for containing the frame structure.

12. The display device as claimed in claim 11 further comprising a foot stand combined with the base support frame and the back cover; the foot stand comprising:
   a main body;
   at least one positioning structure disposed on the main body and corresponding to at least one corresponding positioning structure of the base support frame and the back cover to provide support and position the display device; and
   at least one fastening structure disposed on the main body and corresponding to at least one corresponding fastening structure of the base support frame and the back cover to secure the display device.

13. The display device as claimed in claim 12, wherein the positioning structure is a raised block, and the corresponding positioning structure is a positioning hole.

14. The display device as claimed in claim 12, wherein the fastening structure is a fastening hook, and the corresponding fastening structure is a fastening hole.

* * * * *